W. B. LEONARD.
Fluid Meter.
No. 10,198.
Patented Nov. 1, 1853.
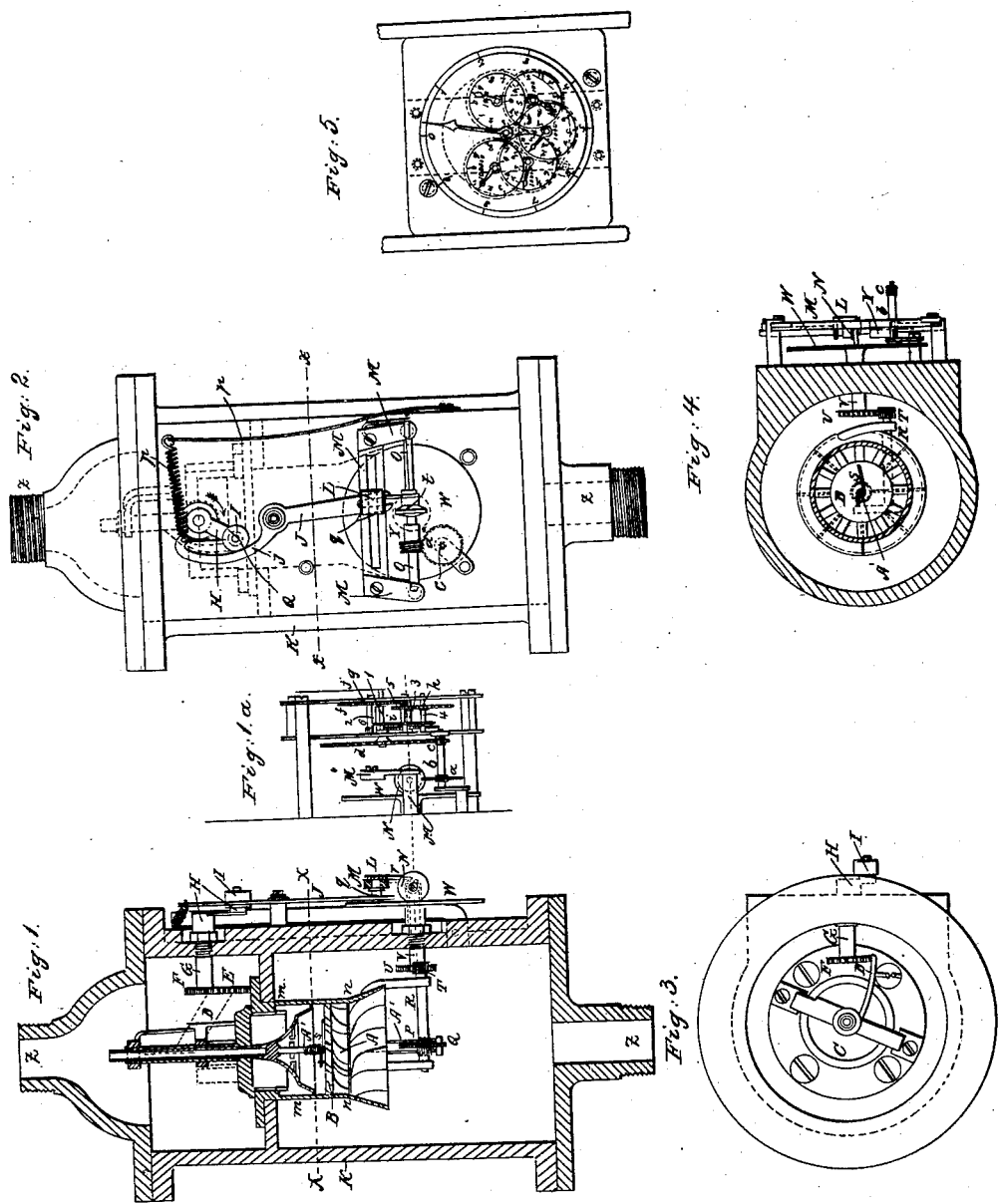

UNITED STATES PATENT OFFICE.

WM. B. LEONARD, OF NEW YORK, N. Y.

FLUID-METER.

Specification of Letters Patent No. 10,198, dated November 1, 1853.

*To all whom it may concern:*

Be it known that I, WILLIAM B. LEONARD, of the city, county, and State of New York, have invented a new and useful Recording Fluid-Meter to be Applied to Conduits to Measure and Record the Quantity of Water or other Fluid that Flows Through the Same, of which the following is a full, clear, and exact description, reference being had to the accompanying drawing, which makes part of this specification, and in which—

Figure 1 represents a sectional elevation of the instrument, a portion of the mechanism being detached and shown in elevation in Fig. 1ᵃ; Fig. 2 represents a front elevation of so much of the exterior of the meter as is shown in section in Fig. 1, the graduated dial or index plate, and indicators or pointers being removed; Fig. 3 represents a top view of so much of the meter as is shown in elevation in Figs. 1 and 2; Fig. 4 represents a section through the line $x-x$ of Fig. 2; and Fig. 5 represents a front elevation of the dial-plate and the indicators.

This instrument is more especially designed for measuring the quantity of water flowing through a pipe, or discharged from an adjutage, and if the water is caused to flow through it, the quantity that passes will be measured with a close approximation to accuracy, however irregular the volume, or velocity of the current. The instrument operates to produce this result by the automatic gaging of the volume or velocity of the current, continuously multiplying these quantities together so as to obtain the mean, or average discharge, and indicates the result accurately upon a dial plate whose capacity for recording, should, in all cases be equal to the maximum discharge of water, during the longest intervals at which observations of the indicated results are noted.

The accompanying drawing represents one of the numerous forms in which a recording meter may be constructed and arranged upon this principle; but it is sufficient to show how the principle may be applied, as I have used an instrument precisely such as is here represented, by way of experiment, for some months, with entire success.

The case of the instrument, in this instance, is made of cast iron, in the form of a hollow cylinder (K) having a diaphragm (X) across its interior, at about two thirds of its height, with a central opening therein. Each end of the cylinder is flanged and is fitted with a correspondingly flanged head from the center of which a short tube (Z) projects outward with a screw cut upon its outer end by which it can be coupled to the ends of the pipe, the flow or discharge of water through which is to be measured.

In the opening through the center of the diaphragm (X) across the interior of the cylindrical part (K) of the case a tube ($m$) is fitted, having a flange on its upper end by which it is bolted or otherwise secured to the diaphragm, this tube projects some distance below the diaphragm and has a screw formed on its lower end, by which it is united to another short tube ($n$) with a corresponding screw on its upper end, and expanded at its lower end so as to form a bell or funnel mouth that the water may enter it more freely. The bell mouth of this lower tube has a series of adjutages formed within it, which incline to the left. Immediately above these adjutages and within the cylindrical portion of the tube ($n$) a pressure water wheel (A) is placed, having buckets inclined to the right, the arrangement of the adjutages and buckets being the same as those in the well known turbine water wheel. The upper side of the wheel is fitted with a star valve (B) that closes its buckets tightly at all times, except when the head of water tending to pass through the instrument is sufficient to overcome the friction of the mechanism, and give motion to the wheel, thus preventing even the trickling of water through the instrument unmeasured. The valve turns freely upon the axis of the water wheel, far enough to open and close the buckets, and is held closed by a spring (S) of barely sufficient tension to counterbalance the amount of force required to overcome the friction of the mechanism, and put the wheel in motion, so that the instant the pressure opens the valve, the flow of water, and motion of the wheel will commence together.

The spindle or shaft (A′) of the water wheel is supported by a step in a bracket at the lower end, and in a box at the upper end formed in the under side of the central boss of a perforated diaphragm, across the tube ($m$) the upper side of this boss is extended into a cylindrical stem, that projects into the upper part of the case, and forms a guide for the discharge valve (C) that closes the top of the tube ($m$) to slide on as it opens and closes to a greater or less extent as the volume of water issuing from the tube is great or small.

The lower end of the water wheel spindle is fitted with an endless screw (P) which gears into a worm wheel (Q) on a shaft (R) supported by brackets, extending from the lower end of the tube (n); the opposite end of this shaft is fitted with a pinion (T) that gears into a wheel (U) on the inner extremity of a shaft (V) which passes through a stuffing box in the side of the case to prevent leakage. On the outer extremity of the shaft (V) a disk (W) of considerable diameter, is mounted whose outer side is planed perfectly true and smooth, but might perhaps be advantageously made in the form of a very obtuse cone. This disk always turns, when the water wheel revolves, and with a velocity always reduced in the same proportion, as it is driven by the water wheel through the intervention of gearing which greatly reduces the motion. As the velocity of the water wheel (A) increases or diminishes in proportion to the velocity of the water running through it, so the valve (C) will be raised higher as the volume of the water increases, and lowered as it decreases to open a passage for the issuing water proportioned to its volume; thus the velocity of the wheel is the measure of the velocity which the water flows, and the height to which the valve rises is the measure of its volume. The manner in which these are multiplied together, to give the quantity of water discharged will be shown presently.

The stem of the valve (C) has an arm (D) projecting from it that carries a rack (E) whose teeth gear into those of a sector (F) on the inner end of a rock shaft (G) which passes through a stuffing box in the side of the case, and carries at its outer end an arm (H) with a friction wheel (I) at its end. When the valve rises it lifts the rack (E) this turns the sector (F), its shaft (G) and the arm (H) in the direction of the arrow (o) and presses the friction wheel (I) against the upper arm of the lever (J) to move it from the shaft (G); when the valve descends again, the movements just described are reversed, and the upper end of the lever (J) is returned again toward the shaft (G) by the tension of a spring (p) which tends to press the lever constantly toward the shaft (G) and at the same time to close the valve (C); so that the movements of the lever, are effected by the joint action of the arm and spring, although its position is controlled by the arm alone.

The lower arm of the lever (J) is forked and embraces a pin (g) which projects from a block (L) fitted to a slot in the bar (M), in which it slides freely, so that when the lever vibrates, the block (L) will traverse the slot. An arm (r) projects downward from the sliding block (L) and enters a groove near one end of a sleeve (t), that slides freely on the cylindrical spindle (O) for the purpose of shifting the position of the sleeve on the same. This sleeve is kept from turning on the spindle (O) by a feather, which extends as far as the sleeve traverses. The other end of this sleeve opposite the groove, in which the shifting arm (r) acts, carries a narrow friction pulley (N) truly cylindrical and concentric with the spindle. The sleeve (t) slides back and forth on the spindle from its middle to one end; on the other half of the spindle, an endless screw (Y) is secured, which acts as the prime mover of clock work, for a purpose to be hereafter described.

The spindle (O) which carries the shifting friction pulley (N) and endless screw (Y) is in the same plane as the spindle (V) and at right angles thereto, so that it is parallel to the disk (W) and at such distance therefrom as will keep the periphery of the pulley (N) firmly pressed against its face, so that when the disk turns the pulley will also be turned by the friction between the two.

If the pulley should bear against the center of the disk, no matter how rapidly the latter might revolve, the former would not derive any motion from it, as that portion of the face of the disk on one side of its center would tend to turn one half of the periphery of the pulley in one direction, with precisely the same force, that the opposite side would tend to turn it in the opposite direction, but the instant the pulley is moved toward one side of the center of the disk, while the latter is revolving, it begins to turn, and will turn with greater speed in proportion as it approaches the periphery of the disk, because the distance which the face of the disk travels, is as the distance from its center, while its angular motion is the same at the center as at the circumference. Now since the angular motion of the disk (W) is proportional to the velocity with which the wheel (A) turns and the water runs, if the volume of the water was invariable, and such that for every revolution of the disk, a gallon would pass, then, if the pulley was placed opposite a point on the disk, whose radius would equal its own, the pulley would revolve an equal number of times with the disk and each revolution of the pulley would correspond to the discharge of a gallon of water through the meter; but if the volume of the current of water through the meter should be contracted one half, by the partial closing of the valve, the velocity of the wheel continuing the same, then two revolutions of the disk would take place, while a gallon of water is passing through the meter, and in order that one revolution of the pulley, may under these altered conditions still indicate the passage of a gallon of water through the meter, it must be placed opposite, and derive its motion from, a part of the face of the disk of only one half the radius of the part which in the former example gave it motion. If now the conditions are again changed so that by opening the valve wider, the volume of water passing through the meter is quadrupled while the velocity is unaltered, the pulley must be moved out to a part of the disk, whose radius is of such length that it will make two revolutions to the disk's one, instead of one to the disk's two, as in the last example, in order that it may make one revolution for every gallon of water that passes through the meter. The disk, as we have seen, turns with a velocity proportioned to that of the current of water through the meter. The distance of the pulley on the face of the disk from its center is kept proportional to the volume of water flowing through the valve, because as the valve opens it acts through the intermediate mechanism, and moves the pulley (N) by the shifting arm (r) acting upon the sleeve (t) to a proportionate distance from the center of the disk, so that the wider the valve opens and the more the water flows, the faster the pulley will turn, and vice versa; the radial distance of the pulley from the center of the disk, being in this way the measure of the volume of water flowing out of the meter through the valve (C), and the velocity with which the disk turns being the measure of the velocity of the outflowing water, and the number of revolutions of the pulley being equal to the product of the velocity of the disk and the length of its radius, which acts upon the pulley to turn it, it follows, that the number of revolutions of the pulley in a given time, equals the volume and velocity of the water multiplied together, or the number of units of the quantity that has flowed through the meter during the time, therefore if the number of revolutions made by the pulley in this manner be recorded, the record will show the number of gallons of water, discharged through the meter during the time, no matter how irregular the velocity and volume may have been, for any change in the velocity is instantly felt by the disk, which moves faster or slower accordingly, and any change in volume is as quickly felt by the pulley, which at once moves nearer to or farther from the axis of the disk, as the volume is lessened or increased; and since the turning of the pulley by the disk, by a differential radius, and angular motion is the perpetual multiplication of the actual velocity and volume, for the instant, of infinitely short lengths of the flowing current, the result is probably a nearer approximation to accuracy, than ordinary measuring in gallon vessels would be. The value of the unit of measure corresponding to one revolution of the pulley N can only be ascertained by experiment.

The recording mechanism is quite simple; it consists of clock work, which derives its motion from the endless screw (Y) on the spindle (O) of the pulley (N) and which of course revolves in equal times with the pulley. The endless screw gears into and drives a wheel (a) on the spindle b that carries a pinion c which drives a large wheel (d) mounted on and turning a spindle 1, which carries on its outer end, which extends through the dial-plate, a pointer 1', which turns around a dial or index circle graduated into ten equal divisions, which denote the corresponding numbers of gallons of water that have flowed through the meter. The spindle 1, carries a pinion which gears into and drives a wheel (f,) ten times its diameter on a spindle 2, on whose outer end a pointer 10, is mounted, which turns on an index circle graduated into ten equal parts which denote corresponding numbers of tens of gallons of water that have passed through the meter. On the spindle 2, a pinion is also mounted, which gears into, and drives a wheel (g) ten times its diameter, on a spindle (3), on whose outer end which also protrudes through the dial plate, an indicator (100) is mounted, which turns around an index circle graduated into ten equal parts which indicate a corresponding number of hundreds of gallons of water that have been discharged through the meter. The spindle 3, also carries a pinion which gears into and drives a wheel (h), ten times its diameter on a spindle (4) on whose outer end, which also protrudes through the dial plate, a pointer (1000) is mounted, which turns around an index circle, graduated into ten equal parts which indicate a corresponding number of thousands of gallons of water that have passed through the meter. The spindle 4, also carries a pinion that gears into a wheel (i) ten times its diameter on a spindle (5), whose pointer (10,000) turns on a graduated circle of ten divisions each of which indicate the number of tens of thousands of gallons that have passed through the meter. The spindle 5, carries a pinion that gears into a wheel (j) ten times its own diameter on a spindle (6), whose pointer (100,000,) turns on a graduated index circle, each of whose ten divisions indicates the number of hundreds of thousands of gallons of water that have passed through the meter.

It is obvious that by extending this train of clockwork to a few elements more, a dial not half the size of that of a common clock might be made to indicate the number of gallons of water that flow, in a year, out of the mouth of the Mississippi, so that the capacity of the instrument to measure and record is fully equal to the capacity of any aqueduct to convey water.

The principle upon which this meter measures and records, it is evident, is susceptible of being carried into effect by many different mechanical contrivances, as for example, instead of the disk and pulley to give a differential motion to the recording mechanism, a pair of cone, or differential pulleys and a belt may be used, the water wheel turning the driving pulley, and the position of the valve that determines the volume of the column of water flowing out of the meter, governing the position of the belt on the pulleys, through the intervention of suitable shifting mechanism. Self acting guard valves to close each bucket of the water wheel; or a valve of any kind to stop the flow of water through any kind of motor until the pressure is sufficient to put the motor in motion may be used.

Instead of the water wheel here represented any other of the multitudinous forms of hydraulic motors known may be employed; in short, any mechanism by which the velocity of the water may be employed to give motion to the clock work, in connection with any mechanism by which the volume of water will control and regulate the motion thus given to the clock work, so as to make the latter indicate the product of the volume multiplied by the velocity, during any given time, would answer the purpose, but that which I have described, I have tried and found to answer the purpose, I shall therefore not describe the details of modifications any further.

What I claim as my invention and desire to secure by Letters Patent, is—

1. The combination in fluid meters of mechanism for measuring the volume of a flowing fluid, however variable; mechanism for measuring the velocity of the flowing fluid, however that may vary; mechanism for multiplying these two quantities together; and mechanism for recording the product in such manner as to show on a register the quantity of fluid that has passed, as herein set forth.

2. I also claim the combination of a self-acting guard-valve (B) or valves however constructed or arranged, with the water wheel, or other motor in a meter, in such manner that the flow of water through the meter will be arrested whenever its pressure is not sufficient to give motion to the motor the instant it begins to flow, whereby the escape of water through the meter unmeasured is prevented.

In testimony whereof, I have hereunto subscribed my name.

W. B. LEONARD.

Witnesses:
I. B. FITZGERALD,
THEODORE D. MARTINE.